United States Patent
Lunzer et al.

(10) Patent No.: US 7,728,054 B2
(45) Date of Patent: Jun. 1, 2010

(54) BINDING AGENTS FOR RADIATION-CURED AQUEOUS PAINTS

(75) Inventors: Florian Lunzer, Graz (AT); Rami-Raimund Awad, Graz (AT)

(73) Assignee: Cytec Surface Specialties Austria GmbH (AT)

(*) Notice: Subject to any disclaimer, the term of this patent is extended or adjusted under 35 U.S.C. 154(b) by 1095 days.

(21) Appl. No.: 10/568,239

(22) PCT Filed: Aug. 20, 2004

(86) PCT No.: PCT/EP2004/009339

§ 371 (c)(1),
(2), (4) Date: Feb. 14, 2006

(87) PCT Pub. No.: WO2005/021615

PCT Pub. Date: Mar. 10, 2005

(65) Prior Publication Data

US 2006/0264527 A1    Nov. 23, 2006

(30) Foreign Application Priority Data

Aug. 27, 2003    (AT) .............................. A 1346/2003

(51) Int. Cl.
*C08L 63/10* (2006.01)
*C08L 63/00* (2006.01)
*C08G 18/00* (2006.01)
*C08G 18/72* (2006.01)

(52) U.S. Cl. ................... 523/415; 523/414; 523/402; 522/90; 522/92; 524/590; 524/591; 524/507; 524/839; 524/840; 528/44; 528/74.5

(58) Field of Classification Search ............... 528/44, 528/74.5; 523/415, 414, 402; 524/590, 591, 524/507, 839, 840; 522/84, 90, 92, 100, 522/104, 168, 170, 173, 174, 178, 181, 182
See application file for complete search history.

(56) References Cited

U.S. PATENT DOCUMENTS

| 5,596,065 A | 1/1997 | Gerlitz et al. |
| 5,691,425 A | 11/1997 | Klein et al. |
| 5,990,192 A | 11/1999 | Gerlitz et al. |

FOREIGN PATENT DOCUMENTS

| AT | 404 733 | 12/1998 |
| CH | 679310 | 1/1992 |
| EP | 0 694 531 | 1/1996 |
| EP | 0 726 162 | 8/1996 |

OTHER PUBLICATIONS

Sandip et al, Bond Strenght Improvement of Polyurethane Adhesive by grafting HEMA on Polyol Backbone. International Journal of Polymeric Materials. vol. 53, Issue 12, pp. 1061-1070. (Dec. 2004).*

* cited by examiner

*Primary Examiner*—Sanza L McClendon
(74) *Attorney, Agent, or Firm*—Connolly Bove Lodge & Hutz LLP

(57) ABSTRACT

The invention relates to binding agents for radiation-cured aqueous paints, said agents containing reaction products ABCDE composed of A epoxy compounds with at least two epoxy groups per molecule, B unsaturated fatty acids, C olefinically unsaturated monomers, D compounds containing unsaturated aliphatic hydroxyl groups and E multi-functional isocyanates, whereby the compounds C are always directly bonded to the compounds B, the compounds D are always directly bonded to the compounds E and the compounds A are always directly bonded to the compounds B. The invention also relates to methods for producing said binding agents and to the use thereof.

12 Claims, No Drawings

BINDING AGENTS FOR RADIATION-CURED AQUEOUS PAINTS

RELATED APPLICATIONS

This application is a national stage application (under 35 U.S.C. 371) of PCT/EP2004/009339 filed Aug. 20, 2004 which claims benefit to Austrian application A 1346/2003 filed Aug. 27, 2003.

FIELD OF THE INVENTION

The invention relates to binders for radiation-curable water-based paints.

BACKGROUND OF THE INVENTION

Water-based paints curable by irradiation with UV light are known from EP-B 0 694 531 and AT-B 404 733. They contain water-dilutable urethane resins as binders.

However, these paints have disadvantages in practical use. In particular, they do not meet the corrosion protection requirements for the painting of metals.

The object is therefore to provide water-dilutable binders for the painting of metals, especially base metals, which give good corrosion protection, where curing may be effected by irradiation with high-energy light.

It has been found that radiation-curable water-dilutable paints based on binders derived from epoxy resins provide coatings with good corrosion protection.

The present invention therefore relates to binders for radiation-curable water-based paints, comprising reaction products ABCDE of epoxy compounds A having at least two epoxide groups per molecule, unsaturated fatty acids B, olefinically unsaturated monomers C, unsaturated aliphatic compounds containing hydroxyl groups, D, and polyfunctional isocyanates E. The compounds C are always directly bonded to the compounds B; likewise, the compounds D are always directly bonded to the compounds E, and the compounds A are always directly bonded to the compounds B.

The invention also provides a process for the preparation of the binders according to the invention.

Finally, the invention further relates to mixtures of the binders according to the invention with aqueous dispersions of acrylate copolymers.

The epoxy compounds A have at least two epoxide groups per molecule and can be aliphatic, aromatic or mixed aromatic-aliphatic. Suitable aliphatic diepoxides or polyepoxides are especially alpha, omega-diepoxyalkanes, such as 1,5-diepoxyhexane or 1,7-diepoxyoctane, ethers of glycidyl alcohol with dihydric or more than dihydric alcohols having from 2 to 20 carbon atoms, such as butanediol diglycidyl ether or hexanediol diglycidyl ether and trimethylolpropane triglycidyl ether, ethers of glycidyl alcohol with polyethylene or polypropylene glycol, or esters of glycidyl alcohol with dibasic or more than dibasic aliphatic carboxylic acids, such as diglycidyl adipate, diglycidyl hexahydrophthalate or diglycidyl esters of dimeric fatty acids. Suitable aromatic diepoxides or polyepoxides are diepoxydivinylbenzene and diepoxydivinylnaphthalene. Suitable mixed aromatic-aliphatic diepoxides or polyepoxides are the diglycidyl ethers of bisphenol A, bisphenol F, dihydroxybiphenyl or dihydroxydiphenyl sulfone. Other suitable compounds are addition products of the said diepoxides or polyepoxides with difunctional or more than difunctional hydroxyl compounds, for example the bisphenol A-based epoxy resins obtained by an advancement reaction.

The unsaturated fatty acids B are linear or branched aliphatic monocarboxylic acids and have at least one olefinic double bond and from 6 to 30 carbon atoms. Suitable compounds are, inter alia, palmitoleic acid, oleic acid, elaidic acid, linoleic acid, linolenic acid, elaeostearic acid, arachidonic acid, erucic acid and clupanodonic acid, as well as mixtures thereof, especially the technical-grade mixtures obtained by the saponification of oils.

Particularly preferred compounds are fatty acids and mixtures thereof which have at least two olefinic double bonds, which in turn are preferably non-conjugated. Linseed oil fatty acid, tall oil fatty acid and sunflower oil fatty acid are particularly suitable.

The olefinically unsaturated monomers C contain a mass fraction of at least 10% of an olefinically unsaturated acid, preferably an olefinically unsaturated carboxylic acid or dicarboxylic acid. It is also possible to use half-esters of olefinically unsaturated dicarboxylic acids with one mol of an alcohol per one mol of a dicarboxylic acid. Preferred olefinically unsaturated acids are acrylic and methacrylic acid, vinylacetic acid and crotonic and isocrotonic acid. Examples of half-esters which can preferably be used are the monomethyl esters of maleic acid, fumaric acid, itaconic acid, citraconic acid or mesaconic acid. Esters of the said acids with monohydric or polyhydric alcohols, such as methyl (meth)acrylate, ethyl (meth)acrylate, n-propyl or isopropyl (meth)acrylate, n-butyl or tert-butyl (meth)acrylate or 2-ethylhexyl (meth) acrylate, as well as diesters of the said dicarboxylic acids, such as dimethyl maleate, and hydroxy-functional compounds (also used as compounds D), such as hydroxyethyl (meth)acrylate, hydroxypropyl (meth)acrylate, hydroxybutyl (meth)acrylate and trimethylolpropane mono(meth)acrylate or di(meth)acrylate, can be used in a mixture with the said acidic monomers. Other suitable monomers are styrene, vinyltoluene, alpha-methylstyrene, para-methylstyrene, vinyl acetate and (meth)acrylonitrile.

The unsaturated aliphatic compounds containing hydroxyl groups, D, are esters of dihydric or more than dihydric alcohols with monomers containing olefinically unsaturated acid groups, especially with acrylic and methacrylic acid. Hydroxyethyl and hydroxypropyl (meth)acrylate are particularly suitable.

The polyfunctional isocyanates E are aromatic, aliphatic and mixed aromatic-aliphatic isocyanates having at least two isocyanate groups. Preference is given to aliphatic isocyanates and those aromatic isocyanates, including diisocyanates, in which the isocyanate groups are bonded to an aliphatic carbon atom, such as xylylene diisocyanate and tetramethylxylylene diisocyanate. Preferred aliphatic isocyanates are linear, branched and cyclic isocyanates having from 4 to 12 carbon atoms, such as hexamethylene diisocyanate, trimethylhexane diisocyanate, isophorone diisocyanate and 1,3- and 1,4-bis(isocyanato)cyclohexane.

The invention further relates to a process for the preparation of the binders ABCDE, wherein, in the first step, the epoxy compounds A are reacted with the unsaturated fatty acids B to give adducts, the amounts of the educts being chosen so that there is at least 0.5 mol of acid groups in the fatty acids B per one mol of epoxide groups in A. A ratio of at least 0.7 mol/mol, especially from 0.9 mol/mol to 1.0 mol/mol, is preferred. In the second step, the adducts AB formed in this way are reacted with the olefinically unsaturated monomers C in the presence of free radical initiators, the compounds C polymerising and at least partially forming grafts on the adducts AB, and the grafting preferably taking place at the double bonds of the fatty acids. The graft copolymers ABC formed in the second step are then reacted with the semicapped isocyanates DE, prepared in a separate step by reacting the hydroxy-functional, olefinically unsaturated monomers D with the polyfunctional, preferably difunctional, isocyanates E, to give the products ABCDE by urethane formation. The reaction is preferably carried out in such a way that the ratio of the amount of substance isocyanate groups in DE to the amount of substance hydroxyl groups in B is 0.2 to 0.9, the ratio preferably being chosen so that the reaction product ABCDE has an acid number of 5 mg/g to 80 mg/g, especially of 10 mg/g to 50 mg/g.

The acid number is defined according to DIN EN ISO 3682 as the ratio of the mass of potassium hydroxide, $m_{KOH}$, required to neutralise a test sample, to the mass of this sample, $m_B$ (mass of the solid in the sample in the case of solutions or dispersions); its conventional unit is "mg/g".

The binders according to the invention are particularly suitable for the formulation of radiation-curable coating agents (curable by UV radiation or electron beams). Photoinitiators are added; on irradiation with high-energy light, these form radicals which initiate curing by polymerisation. A particular feature of the binders according to the invention is their good compatibility with aqueous acrylate dispersions. Such dispersions can be admixed in a mass ratio of up to 50:50 (based in each case on the mass of solids in the dispersions) without adversely affecting the curing rate or the properties of the resulting coating film. The known acrylate dispersions containing hydroxyl groups, as well as self-crosslinking acrylate dispersions, are suitable here.

Preferred acrylate dispersions are self-crosslinking acrylate dispersions based on copolymers of (meth)acrylic acid esters of linear or branched aliphatic monoalcohols having 3 to 10 carbon atoms, (meth)acrylic acid esters of methanol and ethanol, (meth)acrylic acid esters of dihydric aliphatic alcohols having 2 to 6 carbon atoms, especially glycol, 1,2- and 1,3-propanediol, 1,2- and 1,4-butanediol and 1,6-hexanediol, styrene and vinyltoluene, as well as olefinically unsaturated monomers containing carbonyl groups, such as diacetone acrylamide, and hydroxy-functional acrylate dispersions based on copolymers of (meth)acrylic acid esters of linear or branched aliphatic monoalcohols having from 3 to 10 carbon atoms, (meth)acrylic acid esters of methanol and ethanol, (meth)acrylic acid esters of dihydric aliphatic alcohols having from 2 to 6 carbon atoms, especially glycol, 1,2- and 1,3-propanediol, 1,2- and 1,4-butanediol and 1,6-hexanediol, styrene and vinyltoluene. In the case of the self-crosslinking acrylate dispersions, diamines or, preferably, dihydrazines or dihydrazides of aliphatic dicarboxylic acids having from 2 to 8 carbon atoms are used; adipic acid dihydrazide is particularly preferred.

The binders formulated in this way can be used to produce coatings even on base metals, imparting good corrosion protection to the substrate.

The invention is illustrated by the Examples below.

EXAMPLES

Example 1

560 g of linseed oil fatty acid were heated to 140° C. with 0.6 g of triphenylphosphine as catalyst. 380 g of bisphenol A diglycidyl ether were added over two hours, with thorough stirring, and the mixture was stirred at this temperature until epoxide groups were no longer detectable.

Example 2

100 g of the fatty acid epoxy adduct of Example 1 were heated to 140° C. with 70 g of xylene. A mixture of 29.0 g of butyl methacrylate and 15.6 g of methacrylic acid and, separately therefrom, 2.0 g of ditert.-butyl peroxide were added to the previous mixture over 8 hours. When the addition had ended, the resulting mixture was kept at 140° C. for a further 2 hours and then cooled to room temperature. The mass fraction of solids of the resulting solution was 68.1%.

Example 3

222.3 g of isophorone diisocyanate were heated to 50° C. with 0.5 g of triphenyl phosphite. 116.1 g of hydroxyethyl acrylate and 0.2 g of hydroquinone monomethyl ether were added over one hour and the mixture was then heated to 80° C., with stirring, and kept at this temperature until the mass fraction of free isocyanate groups had dropped to 12%.

Example 4

140 g of the product of Example 2 were mixed with 40.0 g of the product of Example 3 and stirred at 80° C. until the proportion by mass of free isocyanate groups had dropped below 0.1%. The temperature was then raised to 130° C. and the xylene was stripped off by distillation under reduced pressure. After cooling to 95° C., 28 g of an aqueous solution of lithium hydroxide (5 g of LiOH in 100 g of aqueous solution) were added. 146 g of demineralised water were then added over one hour at 95° C. to give an aqueous dispersion with a mass fraction of solids of approx. 44% and an acid number of 47.8 mg/g.

Example 5

222.3 g of isophorone diisocyanate were heated to 40° C. with 0.25 g of dibutyltin dilaurate and 0.5 g of triphenyl phosphite. 130.1 g of hydroxypropyl acrylate and 0.2 g of hydroquinone monomethyl ether were added over one hour and the mixture was then heated to 80° C., with stirring, and kept at this temperature until the mass fraction of free isocyanate groups had dropped to 12%.

Example 6

60.0 g of the product of Example 5, 0.01 g of dibutyltin dilaurate and 0.5 g of hydroquinone monomethyl ether were admixed at 80° C. to 147.1 g of the product of Example 2 and the mixture was stirred at 80° C. until the mass fraction of free isocyanate groups had dropped below 0.1%. The temperature was then raised to 130° C. and the xylene was stripped off by distillation under reduced pressure. After cooling to 95° C., 29.1 g of an aqueous solution of lithium hydroxide (5 g of LiOH in 100 g of aqueous solution) were added. 215 g of demineralised water were then added over one hour at 95° C. to give an aqueous dispersion with a mass fraction of solids of approx. 40%.

Example 7

Paint Test 100 g of each of the products of Example 4 and Example 6 were processed to the paints 7.1 and 7.2 with the addition of 6 g of a solution of ®Irgacure 184 in butyl glycol (50 g of ®Irgacure 184 in 100 g of solution).

The following results were obtained:

After application of the paints to an iron sheet with a wet film thickness of 120 μm, drying at from 50° to 60° C. for 10 minutes and then curing by irradiation with a mercury vapour lamp (power: 80 W, at a distance of 10 cm and with a conveyor belt speed of 4 m/min), a smooth speck-free coating was obtained. The measured Erichsen cupping (ISO 1520) was 9 mm in both cases and the results of the impact test (Erichsen, ASTM D 2794-90) and crosshatch test (DIN EN ISO 2409) were 10/10 and 3/5 for the paint 7.1 and 30/20 and 0/5 for the paint 7.2.

Example 8

Resistance Test on Wood

After application of the said paints of Example 7 to wooden boards (200 μm, two coats with drying at from 50° C. to 60° C. for 10 minutes after each coat) and curing as in Example 7, the resistance of the coatings was measured according to DIN 68861, Part 1A. The following results were obtained (exposure time of 16 hours in each case):

| Test material | Coating with paint 7.1 | Coating with paint 7.2 |
|---|---|---|
| Aqueous ammonia solution (10%) | 0 | 0 |
| Aqueous ethanol solution (48%) | 0 | 0 |
| Red wine | 0 | 0 |
| Coffee powder | 0 | 1 |
| Black tea | 0 | 0 |
| Demineralised water | 0 | 0 |
| Lipstick | 0 | 0 |
| Black ballpoint pen ink | 0 | 0 |

Example 9

Mixtures With Acrylate Dispersions

Mixtures of the paints 7.1 and 7.2 with various acrylate dispersions were prepared:

| | |
|---|---|
| 9.1 | self-crosslinking acrylate dispersion based on butyl acrylate/methyl methacrylate/diacetone acrylamide copolymer and adipic acid dihydrazide as crosslinking agent; mass fraction of solids: 45% |
| 9.2 | hydroxy-functional acrylate dispersion based on butyl acrylate, butyl methacrylate and styrene |
| 9.3 | hydroxy-functional acrylate dispersion based on butyl methacrylate, hydroxyethyl methacrylate and styrene |
| 9.4 | self-crosslinking acrylate dispersion based on butyl-acrylate/methyl-methacrylate/styrene/diacetone-acrylamide copolymer and adipic acid dihydrazide as crosslinking agent |

The mixtures (ratio of the mass of solids in the binder according to the invention relative to that of acrylate: 90:10, 75:25 and 50:50) are clear (without turbidity) in all cases and the coated surfaces are faultless without exception when using the paint 7.1, whereas a few streaks could be observed on the surface when using the paint 7.2 with the acrylate dispersion 9.3. When mixing commercial radiation-curable binders with acrylate dispersions in accordance with those mentioned above, turbidity was observed in the mixture in all cases; all the surfaces coated therewith exhibited imperfections in the film.

The invention claim is:

1. Binders for radiation-curable water-based paints, comprising reaction products ABCDE of epoxy compounds A having at least two epoxide groups per molecule, unsaturated fatty acids B, olefinically unsaturated monomers C, unsaturated aliphatic compounds containing hydroxyl groups, D, and polyfunctional isocyanates E, characterised in that the compounds A are bonded to the compounds B by a beta-hydroxyester bond and the compounds C at least partially form grafts on the adducts AB to give compounds ABC, in that the compounds D are bonded to the compounds E by a urethane group to give semicapped isocyanates DE, and in that the compounds ABC are bonded to the compounds DE, likewise with urethane formation, wherein a mass fraction of at least 10% of the monomers C is an olefinically unsaturated acid.

2. Binders according to claim 1, characterised in that the epoxy compounds A are selected from the group consisting of ethers of glycidyl alcohol with dihydric or more than dihydric alcohols having from 2 to 20 carbon atoms, ethers of glycidyl alcohol with polyethylene or polypropylene glycol, esters of glycidyl alcohol with dibasic or more than dibasic aliphatic carboxylic acids, and diglycidyl ethers of bisphenol A, bisphenol F, dihydroxybiphenyl and dihydroxydiphenyl sulfone, and addition products of the said diepoxides with difunctional or more than difunctional hydroxyl compounds.

3. Binders according to claim 1, characterised in that the unsaturated fatty acids B are linear or branched aliphatic monocarboxylic acids and have at least one olefinic double bond and from 6 to 30 carbon atoms.

4. Binders according to claim 1, characterised in that the olefinically unsaturated monomers C are selected from the group consisting of olefinically unsaturated carboxylic acids, olefinically unsaturated dicarboxylic acids, and from half esters of olefinically unsaturated dicarboxylic acids with one mol of an alcohol per one mol of olefinically unsaturated dicarboxylic acids.

5. Binders according to claim 1, characterised in that the unsaturated aliphatic compounds containing hydroxyl groups, D, are esters of dihydric or more than dihydric alcohols with monomers containing olefinically unsaturated acid groups.

6. Binders according to claim 1, characterised in that the polyfunctional isocyanates E are aromatic, aliphatic and mixed aromatic-aliphatic isocyanates having at least two isocyanate groups.

7. A process for the preparation of binders according to claim 1, characterised in that in the first step, the epoxy compounds A are reacted with the unsaturated fatty acids B to give adducts, at least 0.5 mol of acid groups in the fatty acids B being used per 1 mol of epoxide groups in A, in the second step, the adducts AB formed in this way are reacted with the olefinically unsaturated monomers C in the presence of free radical initiators, the compounds C polymerising and at least partially forming grafts on the adducts AB, in a separate third step, semicapped isocyanates DE are prepared by reacting the hydroxy-functional, olefinically unsaturated monomers D with the polyfunctional, preferably difunctional, isocyanates E, and in the fourth step, the isocyanates DE are reacted with the graft copolymers ABC formed in the second step to give the products ABCDE by urethane formation, wherein a mass fraction of at least 10% of the monomers C is an olefinically unsaturated acid.

8. The process according to claim 7, characterised in that a ratio of at least 0.7 mol/mol is chosen in the first step.

9. The process according to claim 7, characterised in that a ratio of the amount of substance of isocyanate groups in DE to the amount of substance of hydroxyl groups in B of 0.2 to 0.9 is chosen in the fourth step.

10. The process according to claim 7, characterised in that the ratio of the amounts of substance in the fourth step is chosen so that the reaction product ABCDE has an acid number of from 5 mg/g to 80 mg/g.

11. A method of use of binders according to claim 1 for the preparation of radiation-curable coating agents for wood, metal and plastics, comprising mixing the binders according to claim 1 and photoinitiators.

12. The method of use according to claim 11, comprising admixing aqueous acrylate dispersions.

* * * * *